(12) United States Patent
Zimmet et al.

(10) Patent No.: US 8,868,746 B2
(45) Date of Patent: Oct. 21, 2014

(54) ALLOCATION OF CENTRAL APPLICATION RESOURCES BASED ON SOCIAL AGREEMENTS

(75) Inventors: Carol S. Zimmet, Westford, MA (US); Patrick O'Sullivan, Dublin (IE); Liam Harpur, Dublin (IE); Kai Wei, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/579,580

(22) Filed: Oct. 15, 2009

(65) Prior Publication Data

US 2011/0093596 A1 Apr. 21, 2011

(51) Int. Cl.
G06F 15/173 (2006.01)
G06F 17/00 (2006.01)
G06F 9/46 (2006.01)
G06F 9/50 (2006.01)

(52) U.S. Cl.
CPC .................................. *G06F 9/5061* (2013.01)
USPC .............................. 709/226; 726/1; 718/104

(58) Field of Classification Search
USPC ........................................................ 709/226
See application file for complete search history.

(56) References Cited

U.S. PATENT DOCUMENTS

| | | | |
|---|---|---|---|
| 7,305,002 B1 * | 12/2007 | Ageby et al. | 370/442 |
| 7,774,468 B1 * | 8/2010 | Nag et al. | 709/226 |
| 7,894,371 B2 * | 2/2011 | Bonta et al. | 370/254 |
| 2003/0217092 A1 * | 11/2003 | Veselov | 709/106 |
| 2006/0089988 A1 * | 4/2006 | Davie et al. | 709/225 |
| 2006/0095917 A1 | 5/2006 | Black-Ziegelbein et al. | |
| 2006/0123112 A1 * | 6/2006 | Spry | 709/226 |
| 2006/0143617 A1 * | 6/2006 | Knauerhase et al. | 718/104 |
| 2006/0149611 A1 | 7/2006 | Diep et al. | |
| 2006/0184938 A1 | 8/2006 | Mangold | |
| 2006/0236064 A1 | 10/2006 | Niles et al. | |
| 2006/0242072 A1 | 10/2006 | Peled et al. | |
| 2006/0242155 A1 | 10/2006 | Moore et al. | |
| 2006/0294571 A1 | 12/2006 | Moore et al. | |
| 2007/0043772 A1 | 2/2007 | Chouanard et al. | |
| 2007/0113009 A1 | 5/2007 | Fujibayashi | |
| 2007/0180306 A1 | 8/2007 | Soran et al. | |
| 2007/0297757 A1 | 12/2007 | Kauffman et al. | |
| 2008/0126547 A1 * | 5/2008 | Waldspurger | 709/226 |
| 2008/0155100 A1 * | 6/2008 | Ahmed et al. | 709/226 |
| 2009/0037529 A1 * | 2/2009 | Armon-Kest et al. | 709/204 |
| 2010/0211682 A1 * | 8/2010 | Capomassi et al. | 709/226 |
| 2010/0241751 A1 * | 9/2010 | Sonoda et al. | 709/226 |

* cited by examiner

*Primary Examiner* — Ranodhi Serrao
(74) *Attorney, Agent, or Firm* — Schmeiser, Olsen + Watts LLP

(57) ABSTRACT

Described is a method for allocating a central application resource. Upon a determination that a user has depleted an allocation of the resource, a request for an additional allocation of the resource is generated. The user is a member of a group of users that is a subset of all users of the central application resource. After determining that the request is valid according to a policy defining rules for allocation relevant to the user, the additional allocation is provided to the user. An allocation of the resource is reduced for one or more other users in the group so that a total allocation of the resource for the group remains unchanged.

19 Claims, 3 Drawing Sheets

ALLOCATION OF CENTRAL APPLICATION RESOURCES BASED ON SOCIAL AGREEMENTS

BACKGROUND

The invention relates generally to the field of resource allocation, and in particular to a method and system for allocation of a central application resource for a subset of users of the resource.

Allocations are often used to control the use of centralized resources by multiple users. For example, disk quotas are typically assigned to control database growth. Multiple users in a production environment are effectively managed so that the amount of disk space that is practically required can be limited. At times, a user may knowingly or unknowingly fully utilize their allocation of disk space and subsequent incoming content that would cause the allocation to be exceeded is therefore not accepted. Conventional options for addressing this situation include removing previously-stored content to thereby create additional disk space for the user; otherwise the incoming content may be refused. Alternatively, a user may attempt to contact a member of an information technology (IT) department to obtain a change in their personal allocation of disk space; however, the success of this alternative is dependent on the availability of IT personnel which can vary significantly based on time of day and calendar day. Personnel availability can also be problematic when working with geographically distant or global workforces.

BRIEF SUMMARY

According to one embodiment of the invention, a method for allocation of a central application resource includes determining for a user in a group of users of a central application resource that the user has depleted an allocation of the central application resource. The group of users is a predefined subset of all users of the central application resource. A request for an additional allocation of the central application resource for the user is generated. The method also includes determining that the request is valid based on a policy defining rules for allocation relevant to the user. The additional allocation of the central application resource is provided to the user. An allocation of the central application resource is reduced for at least one other user in the group of users so that a total allocation of the central application resource for the group of users remains unchanged.

According to another embodiment of the invention, a computer program product for allocation of a central application resource includes a computer readable storage medium having computer readable program code embodied therewith. The computer readable program code includes:
computer readable program code configured to determine that a user in a group of users of a central application resource has depleted an allocation of the central application resource where the group of users is a predefined subset of all users of the central application resource;
computer readable program code configured to generate a request for an additional allocation of the central application resource for the user;
computer readable program code configured to determine that the request is valid based on a policy defining rules for allocation relevant to the user; and
computer readable program code configured to provide the additional allocation of the central application resource to the user; and
computer readable program code configured to reduce an allocation of the central application resource for at least one other user in the group of users so that a total allocation of the central application resource for the group of users remains unchanged.

According to another embodiment of the invention, an apparatus for allocating a central application resource includes means for determining that a user in a group of users of a central application resource has depleted an allocation of the central application resource. The group of users is a predefined subset of all users of the central application resource. The apparatus also includes means for generating a request for an additional allocation of the central application resource for the user and means for determining that the request is valid based on a policy defining rules for allocation relevant to the user. The apparatus further includes means for providing the additional allocation of the central application resource to the user and means for reducing an allocation of the central application resource for at least one other user in the group of users so that a total allocation of the central application resource for the group of users remains unchanged.

BRIEF DESCRIPTION OF SEVERAL VIEWS OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

Figure 1:
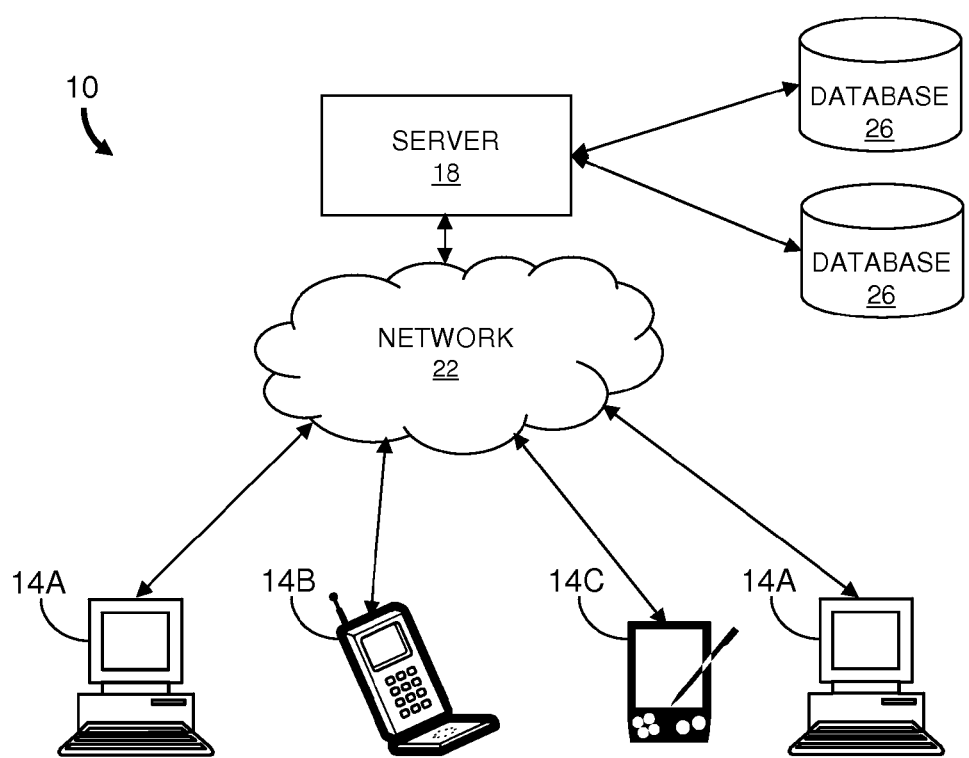
FIG. 1 illustrates an environment in which an embodiment of the method of the invention can be practiced.

In the following description, specific details are set forth although it should be appreciated by one of ordinary skill that the present invention can be practiced without at least some of the details. In some instances, known features or processes are not described in detail so as not to obscure the present invention.

The present invention enables one or more users to benefit from decisions and agreements made by one or more individuals regarding the management and availability of a central application resource. Users socially decide and manage the availability of the central application resource. A group of users that is a defined subset of all users of the resource is managed by a designated team. Users in the group request, either expressly or automatically, relief when a depletion of their allocation of the resource occurs. Thus users remain productive and are unaffected by insufficient application disk space in their respective application interactions as relief is received in a transparent manner.

By way of example, a user receiving incoming content receives a notification that their user disk quota is exceeded. The user receives relief in the form of an allocation of additional disk space according to their social relationships, such as team, project, organization and/or geographic relationships, with other users that have available disk space. Social agreements are established to define how the allocation transfer occurs between the users. Individuals managing disk space for the users in the group work within limits set for the overall production environment for the group by their IT department. Policy documents define what resources are made available to which individuals and the terms for such availability. In some embodiments, an explicit social agreement is used to obtain the additional allocation. In other embodiments, predefined rules established by the managing individuals are executed automatically to initiate the allocation transfer. In still other embodiments, agreements are established directly between two users so that one user effectively lends available disk space to increase the total allocation of the borrowing user while decreasing the total allocation of the lending user.

Although embodiments described below refer primarily to application disk space for electronic mail, the invention also contemplates that a central application can be other types of collaborative applications that enforce application resource quotas such as team spaces, wikis, blogs, activities, centrally stored instant messaging (IM) chat messages and the like. By way of specific examples, the central application resource can be centralized central processing unit (CPU) usage, memory, bandwidth shared among network users and various types of centralized data storage.

Advantageously, the generation of the request for additional allocation, the decision to allocate and the management of the allocation are independent of the IT department and are transparent to the application. Moreover, as some users can have substantially under-utilized allocations of the resource, the method of the invention enables more efficient use of the overall resource allocation for the group, in effect providing a means of distributing the overall resource allocation to handle dynamic changes in the demand for the central application resource in a transparent manner.

Though described below primarily as a method, it will be appreciated by one skilled in the art that aspects of the present invention may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

In some embodiments, the method of the invention is implemented by way of a server hosting or supporting a central application dependent on the resource. For example, FIG. 1 shows an environment 10 in which an embodiment of the method of the invention can be practiced where various users of various client devices 14 (e.g., personal computers 14A and mobile devices 14B and 14C) communicate with a server 18 through an intervening network 22. The server 18 may execute one or more user applications requiring access to a central application resource (shown in the figure as databases 26). Alternatively, the client devices 14 may execute user applications that utilize the central application resource 26. Although the illustration environment 10 includes a single server 18, the method of the invention can be practiced in other environments that having different server, database and client device configurations such as distributed server and/or distributed database configurations.

Aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following description includes examples of how the method of the invention is applied to specific user scenarios although it should be recognized that the method can be applied to other circumstances that would benefit from the method of allocation of resources as described herein.

Example 1

Figure 2A:
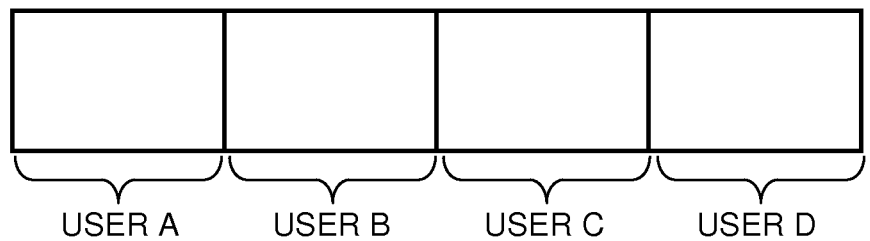
FIGS. 2A, 2b and 2C are graphical depictions of disk space allocation for users according to execution of an embodiment of a method of the invention.
Figure 2B:
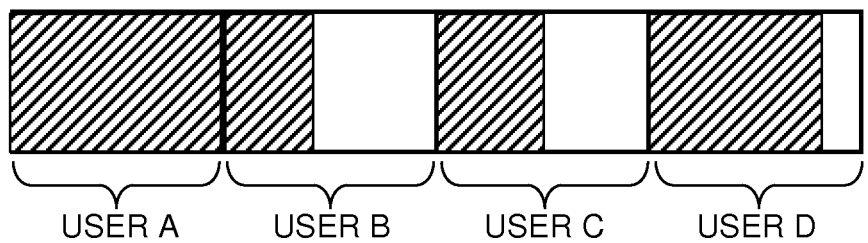

Referring to FIG. 2A, Users A, B and C have a disk quota, or disk space allocation, assigned to their respective email inboxes. For purposes of this example, the initial allocations to the users, graphically represented by the four rectangles, are for equal disk quotas. FIG. 2B shows that the disk space allocated to User A has been fully utilized (as indicated by the fully-shaded region of the User A allocation); however, the other users are not aware that the quota has been reached so they continue to send email to User A. User B, User C and User D have utilized only a portion of their respective allocations. If no action is taken, User A is unable to receive subsequent emails. In some conventional email systems, a delayed delivery option is provided in which an email that initially is not successfully received by the user is resent after a delay time. Delayed delivery can occur up to a specified maximum number of retries; however, User A remains unable to receive subsequent emails if no action is taken before the maximum number of retries is reached.

User A can take action by affirmatively deleting prior emails in the inbox to free up space; however, this action can be burdensome, especially if the effort involved requires significant user time. For example, User A may not have time available when the quota is first reached and notification is received. Under such circumstances, incoming emails continue to be lost until User A performs the deletions.

Figure 3:
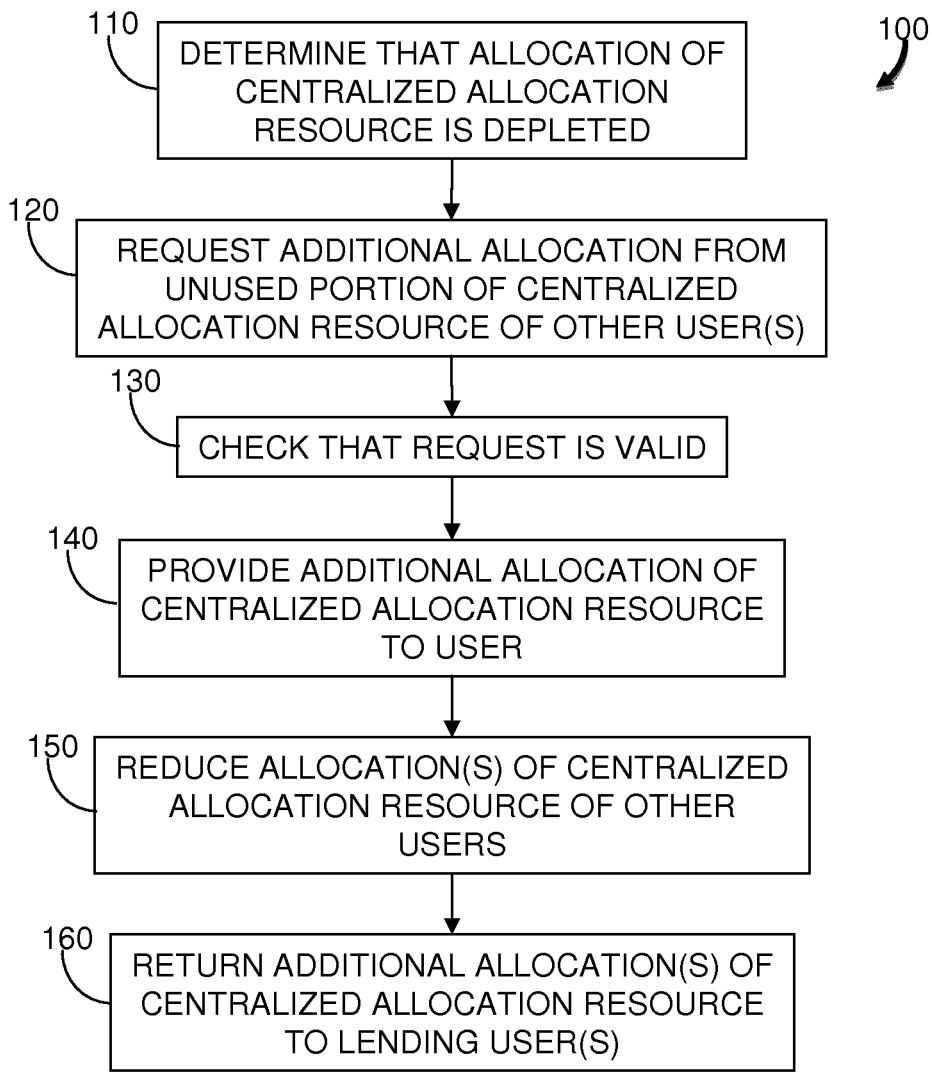
FIG. 3 is a flowchart representation of an embodiment of a method of allocation of a central application resource.

According to an embodiment of the method 100 of the invention as shown in FIG. 3, User A determines (step 110) that the user's allocation of the central application resource (i.e., application disk space allocated for the email inbox) is no longer adequate to meet the application needs for the user. User A generates (step 120) a request for User B to provide a portion of the unused allocation of user B for User A's use.

A check is performed (step 130) to ensure that the transfer of the desired additional allocation is possible based on group policy for the users and actual resource availability of the lending user (User B). The group policy is expressed in a disk quota profile document previously created by the group to specify the rules for handling the transfer of disk allocations. The profile document can indicate users permitted to have quotas that can be increased and users for which respective quotas are allowed to decrease. Moreover, individual and corporate level agreements can be enforced through the group policy. For example, there may be a limit to the amount of disk space that can be under loan at one time and the number of lending users can be limited according to a predefined number identified in the profile document. In addition, rules limiting the duration of loans and the number of loans between a user and other users can be enforced.

Multiple profile documents can exist, and a predetermined hierarchy for application of the rules and decision making is followed for such situations. More specifically, policies for reallocation of central allocation resources can be established at different levels in an organizational hierarchy. An administrator can set a priority policy according to the position of the administrator in the hierarchy. Sub-organization profiles cooperate with higher level profiles. For example, a higher level profile may define a common resource pool for the organization to be allocated in an automatic manner. A lower level policy defined by a manager of a certain group can pool an allocated resource for members of the group for use in a request then approve manner. When a user within the group experiences a user resource allocation limitation, the priority policy determines how additional allocation is first attempted. For example, the priority policy can (1) cause a transfer from the common resource pool for the organization, (2) defer to the lower level policy to thereby initiate the request and approve process using the group pool, or (3) send a request to the manager to cause a decision as to which policy should be exercised.

Figure 2C:
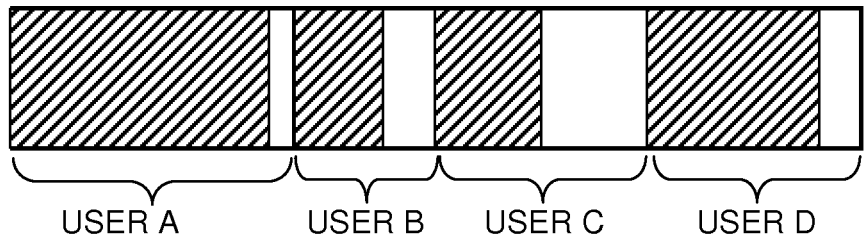

If the request is valid according to policy and available resource allocation, a portion of the unused allocation of User B is provided (step 140) to User A. The process may include an optional step where User B confirms a willingness to provide the requested portion of User B's allocation. Thereafter User A makes use of the original allocation to User A plus the granted portion of User B's original allocation as depicted in FIG. 2C. User B now has a reduced allocation (step 150) according to the amount granted and transferred to User A. The allocations to User C and User D are unaffected during the transaction.

In a further embodiment, steps 120 and 130 as described above include generation of the request either automatically on behalf of User A or by an affirmative user action performed by User A such as creating and sending a message to User B. In the former instance, if User A and User B are in an IM chat, both users are prompted regarding the potential transaction if rules according to the profile handling document are satisfied. The potential lending user may simply click a button in the notification labeled "lend 20 MB" (or some other value) to complete validation of the request.

In another alternative embodiment, User A can request and receive a grant of portions of the unused allocations of multiple users. Referring again to FIG. 2, such grants could include unused portions of allocations of two or more of Users B, C and D. Thus the disk space available to User A increases by the sum of the amounts of the granted allocations while the lending users have their allocations reduced according to their respective contributions. In another alternative embodiment, a single user lends portions of their unused resource allocation to two or more borrowing users.

The grant of an unused portion of a user allocation is considered a loan of that portion. The users involved negotiate and manage the transfer. The lending user (User B) specifies the amount of the resource to be made available to the borrowing user (User A). The borrowing user controls and initiates when the received allocation is returned (step 160) to the lending user, resulting in the user central resource allocations being adjusted back to their original amounts as shown in FIG. 2A. Alternatively, the lending user defines the terms of the loaned allocation, for example, by specifying the amount of application disk space to be loaned, the time interval for the loan to remain in effect, means for renewing the loan (if any)

and how the borrowing user will receive reminders regarding return of the borrowed resource allocation.

Lending rules can be enforced by means of the policy documents described above and such rules may limit or override the intentions of the transacting users. By way of example, lending rules that can be implemented according to Example/include:

a. No return of the transferred allocation is required.
b. The transferred allocation is automatically returned when the borrowing user regains original allocation space equal to the borrowed allocation.
c. The borrowing user returns the borrowed allocation once the originally-allocated space is "cleaned up."
d. The lending user specifies a time interval. After expiration of the time interval, the borrowed allocation will be automatically returned from the borrowing user to the lending user. Optionally, the borrowing user will receive one or more notifications in advance of the return transaction.

In the example above, an agreement to lend a portion of a user allocation to another user arises only after the determination that a user has reached their disk quota, for instance, by receiving an email; however, in an alternative embodiment, a contingent agreement can be established by a potential lending user (User B). More specifically, User B may send an email to User A that contains important content. User B wants to ensure that User A receives the content so the email with a contingent agreement that executes if receipt of the email would result in User A exceeding their disk quota allocation. If necessary, the contingent agreement executes and a transfer of a portion of the disk space allocated to User B is automatically transferred to User A. The amount of transferred disk space allocation can be set based on the amount of data in the email. Alternatively, the amount of the transferred allocation can be determined according to an amount necessary to avoid a disk space depletion by User A.

In an alternative embodiment, if an event, such as an email sent from User B to User A, causes User A to exceed the disk space quota, both users are notified. The sending user is informed that the event is the cause of User A's disk space depletion and that the event might not be completed unless User B is willing to lend to User A. Thus User B can make an informed decision regarding whether or not to take action to ensure the completion of the event (e.g., successful delivery of the email to User A).

In some environments, such as businesses or users that wish to encourage the lending and borrowing portions of allocations, a lending user is credited with "points" according to one or more of the number of transactions and the amount of loaned allocation resource. The points can be redeemable from the business at a later time. For example, the lending user would receive preferential treatment for other quotas or be redeemable at a later time from the borrowing user.

Example 2

A user has a disk quota assigned to an email inbox. While the user is away from work for an extended period, for example, during a long vacation when access to the email inbox is not available, the inbox reaches an assigned disk quota. Typically, emails are not able to be received by the user until the user performs a deletion process at a later time to free up space in the email inbox.

According to an embodiment of the method of the invention, if the user is associated with a group that collectively has other users with extra disk space, the user is granted coverage against an excess disk space situation. By way of example, the group can be a company department, division team or other collection of users defined according to a project, task or organizational boundary within the company. The group can also be a social network in which the user is a member or a group defined according to geographical location or timezone division. Preferably, one or more users within the group establish at least some of the rules for lending and other transfers of resource allocations although other rules based on higher level organizational requirements may also be imposed. If the user is about to exceed the user's disk space quota, disk space from a common group pool is allocated and the user never experiences a disk space depletion. Thus the allocation transfer occurs in a transparent manner and explicit user action is not required during the user's absence from work. Preferably, the user is alerted upon return to work as to how much additional disk space was allocated and the sources of the additional disk space so that the user can reduce their requirements and dependency soon thereafter.

Example 3

A user in a company environment may be subject to temporary situations during which the amount of content received can substantially exceed that of other users in the company. For example, the user may be employed as a Release Manager for a product. Near the time of product release there is substantial content that is exchanged and reviewed by the user. At times, the user may need to acquire access to additional disk space to accommodate incoming and active content.

According to an embodiment of the method of the invention, the available disk space for members of the product release team is pooled and one or more managers or "decision makers" allocate portions of a predetermined size (e.g., 50 MB) to team members as their needs arise. In this example, a user applies to a manager for relief. In response, the manager assigns the user a predetermined time (e.g., a three month grace period) for extending the user's disk space quota and transfers the additional allocation from the common pool. Other members of the team receive an allocation that is reduced with respect to an average allocation for the team so that the total disk space quota assigned for the team by the IT department is not violated. After the increased need is no longer present, the borrowed allocations are returned to the allocation pool.

In an alternative embodiment, the method provides a more permanent solution for managing users with different central application resource quotas. Thus certain users are allocated one amount of disk space while another set of users is allocated by default a different amount of disk space. By way of example, users on a graphics-based project group may need larger disk quotas based on anticipated content exchanges than users in other groups or departments such as a manufacturing department. The combined needs of the two groups can be met within the overall central resource allocated to the two groups by the IT administration by managing the allocations according to the method of the invention. Similarly, a manager may know from experience that a certain user receives content at a rate that exceeds a rate for a typical corporate employee and therefore the manager allocates extra disk space to the user on a more permanent basis. Other members of the team receive an allocation that is reduced with respect to the typical corporate employee allocation so that the total disk space quota for the team does not violate the average corporate employee allocation.

The one or more managers are responsible for managing the pooled disk space and making decisions as to how allocations are made available to members of the group or team that are consistent with rules established by the group and/or the overall company. In an alternative embodiment, all members of the group contributing to the pool can be required to be in agreement for all allocation transfers.

It should be recognized in the examples above that the Example 2 is distinguished from Example 3 because the additional allocation occurs automatically. That is, the transfer of the additional allocation occurs without any affirmative action by the user or other individuals. In effect, the user in Example 2 operates under a subscription in which the user is pre-approved to automatically receive additional application disk space from a common pool as the need arises as the decision-making process has already occurred at the establishment of the pooling arrangement.

In a variation of the examples given above, two or more allocation strategies can be combined. For example, pooled resource allocations can be subdivided into smaller allocations that are subject to one or more other distribution strategies. This tiered approach can be employed to achieve allocations of the central application resource that are more appropriate for specific users or user groups within the total user community.

Lending rules can be enforced by means of the policy documents described above. By way of example, lending rules that can be implemented according to Example 2 and Example 3 above include
 a. The borrowed allocation is automatically returned to the resource pool when the borrowing user regains a sufficient amount of the resource to equal or exceed the borrowed amount.
 b. The borrowing user is allowed to return the borrowed allocation once an amount of the borrower's personal allocation equal to or greater than the borrowed amount is cleaned up. Optionally, reminders are sent urging the borrowing user to complete the clean up process and return the borrowed allocation to the resource pool.

During execution according to embodiments of the method, an electronic agreement document is generated for each instance of a request or grant of a central resource allocation. The agreement document includes data that identifies the decision makers and the users participating in the allocation transfer, and, for temporary transfers, can also include information regarding the time interval which, upon expiration, results in the termination of the borrowed allocation. In one embodiment, the agreement document specifies whether the allocation transfer is explicit (e.g., Example 1) or implicit (e.g., Example 2). An agent is executed on a periodic basis, such as a daily basis, to read the profile documents and to ensure that resource allocations are correctly balanced based on the agreement documents.

While the invention has been shown and described with reference to specific embodiments, it should be understood by those skilled in the art that various changes in form and detail may be made therein without departing from the spirit and scope of the invention.

What is claimed is:

1. A method for allocation of a central application resource, the method comprising:
 determining, by a processor, for a user in a group of users of a central application resource that the user has depleted an original allocation of the central application resource, the group of users being a predefined subset of all users of the central application resource;
 generating a request for an additional allocation of the central application resource for the user;
 determining that the request is valid based on a policy defining rules for allocation relevant to the user; and
 providing the additional allocation of the central application resource from a lender in the group of users to the user in response to determining that the original allocation of the central application resource is depleted;
 at least one of approving and controlling by the lender the additional allocation to the user; and
 reducing an allocation of the central application resource for at least the lender in the group of users whereby a total allocation of the central application resource for the group of users remains unchanged.

2. The method of claim 1 wherein the policy defining rules for allocation is established by at least one member of the group of users.

3. The method of claim 1 wherein the central application resource comprises one of an application disk space, a central processing unit usage, a memory and a network bandwidth.

4. The method of claim 1 wherein the additional allocation is available from a pool of portions of unused allocations of users in the group and wherein reducing an allocation comprises reducing a total allocation of the central application resource for the pool.

5. The method of claim 1 wherein, after expiration of a predetermined time interval, the additional allocation of the central application resource to the user is returned to the at least one other user whereby the total allocation of the central application resource for the group remains unchanged.

6. The method of claim 1 wherein the generation of the request for an additional allocation occurs without user interaction in response to the determination that the user has depleted the original allocation of the central application resource.

7. The method of claim 1 wherein generating the request comprises the user performing an affirmative user action.

8. The method of claim 7 wherein the affirmative user action comprises generating a message to send to at least one other user in the group regarding the request for an additional allocation.

9. The method of claim 7 wherein the affirmative user action comprises generating a notification to a manager of the group of users regarding a need for the additional allocation.

10. The method of claim 1 further comprising terminating the additional allocation of the central application resource to the user after expiration of a predetermined time interval.

11. The method of claim 1 wherein the central application resource is disk space for user emails.

12. The method of claim 11 wherein the generation of a request occurs in response to receiving an email having content that causes an allocation of disk space for the user to be depleted.

13. The method of claim 1 further comprising terminating the additional allocation of the central application resource to the user after expiration of a predetermined time interval.

14. A computer program product for allocation of a central application resource, the computer program product comprising:
 a non-transitory computer readable storage medium having computer readable program code embodied therewith, the computer readable program code comprising:
 computer readable program code configured to determine that a user in a group of users of a central application resource has depleted an original allocation of the central application resource, the group of users being a predefined subset of all users of the central application resource;

computer readable program code configured to generate a request for an additional allocation of the central application resource for the user;

computer readable program code configured to determine that the request is valid based on a policy defining rules for allocation relevant to the user;

computer readable program code configured to provide the additional allocation of the central application resource from a lender in the group of users to the user in response to the computer readable program code determining that the original allocation of the central application resource is depleted;

computer readable program code configured to at least one of approve and control by the lender the additional allocation to the user; and computer readable program code configured to reduce an allocation of the central application resource for at least one other user in the group of users whereby a total allocation of the central application resource for the group of users remains unchanged.

15. The computer program product of claim 14 wherein the central application resource comprises one of an application disk space, a central processing unit usage, a memory and a network bandwidth.

16. The computer program product of claim 14 wherein the additional allocation is available from a pool of portions of unused allocations of users in the group and wherein reducing an allocation comprises reducing a total allocation of the central application resource for the pool.

17. The computer program product of claim 14 further comprising computer readable program code configured to terminate the additional allocation of the central application resource to the user after expiration of a predetermined time interval.

18. The computer program product of claim 17 further comprising computer readable program code configured to increase an allocation of the central application resource for the at least one other user in the group of users whereby the total allocation of the central application resource for the group of users remains unchanged.

19. The computer program product of claim 14 wherein the computer readable program code configured to generate a request a request comprises computer readable program code to generate a graphical user interface to enable the user to generate a message to at least one other user in the group regarding a need for an additional allocation.

* * * * *